United States Patent [19]

Sevelinge

[11] Patent Number: 5,201,112
[45] Date of Patent: Apr. 13, 1993

[54] DEVICE FOR THE SIMULTANEOUS POSITIONING OF A PLURALITY OF THREADED CONNECTING ELEMENTS

[75] Inventor: Gerard Sevelinge, Chalon/Saone, France

[73] Assignee: Framatome, Courbevoie, France

[21] Appl. No.: 704,388

[22] Filed: May 23, 1991

[30] Foreign Application Priority Data

May 23, 1990 [FR] France ............................. 90 06465

[51] Int. Cl.⁵ .............................................. B23P 21/00
[52] U.S. Cl. ........................................ 29/705; 29/714; 29/723; 29/281.1; 29/281.5
[58] Field of Search ............... 29/705, 714, 709, 723, 29/281.1, 281.5

[56] References Cited

U.S. PATENT DOCUMENTS

| | | | |
|---|---|---|---|
| 4,223,575 | 9/1980 | Krueger | 29/723 |
| 4,785,520 | 11/1988 | Bourdonne et al. | 29/723 |
| 4,873,760 | 10/1989 | Watanabe et al. | 29/714 |

FOREIGN PATENT DOCUMENTS

| | | | |
|---|---|---|---|
| 0220983 | 5/1987 | European Pat. Off. | |
| 243218 | 10/1987 | France | 29/723 |
| 189082 | 10/1984 | Japan . | |
| 49148 | 11/1984 | Japan | 29/723 |
| 232737 | 12/1984 | Japan . | |
| 672 | 4/1980 | PCT Int'l Appl. | 29/723 |

*Primary Examiner*—P. W. Echols
*Assistant Examiner*—David P. Bryant
*Attorney, Agent, or Firm*—Pollock, Vande Sande & Priddy

[57] ABSTRACT

Device for the simultaneous positioning of a plurality of threaded connecting elements (1) carried by a supporting member (8) and intended for fastening a component (2) placed on an appliance (3), the component (2) having open-ended bores (5) for the passage of the threaded connecting elements (1), and the appliance having tapped holes (4) corresponding to the open-ended bores (5) and capable of receiving the threaded connecting elements (1), including provision for permanent checking and correction of the position of the axes of the threaded connecting elements (1) in relation to the axes of corresponding tapped holes (4), and of the horizontality of the supporting member (8), and a lifting beam.

8 Claims, 5 Drawing Sheets

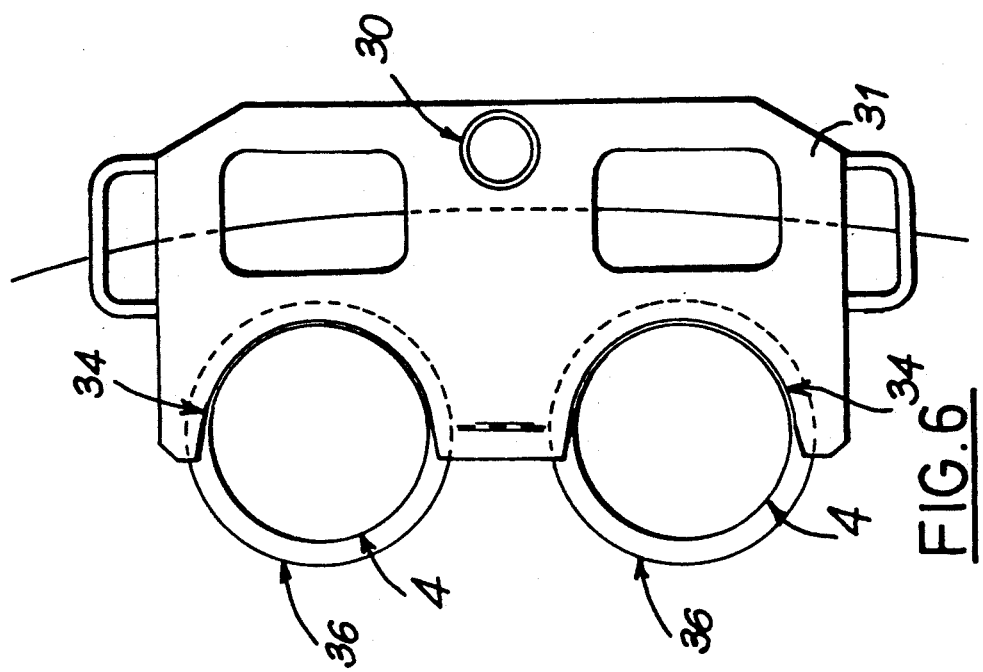
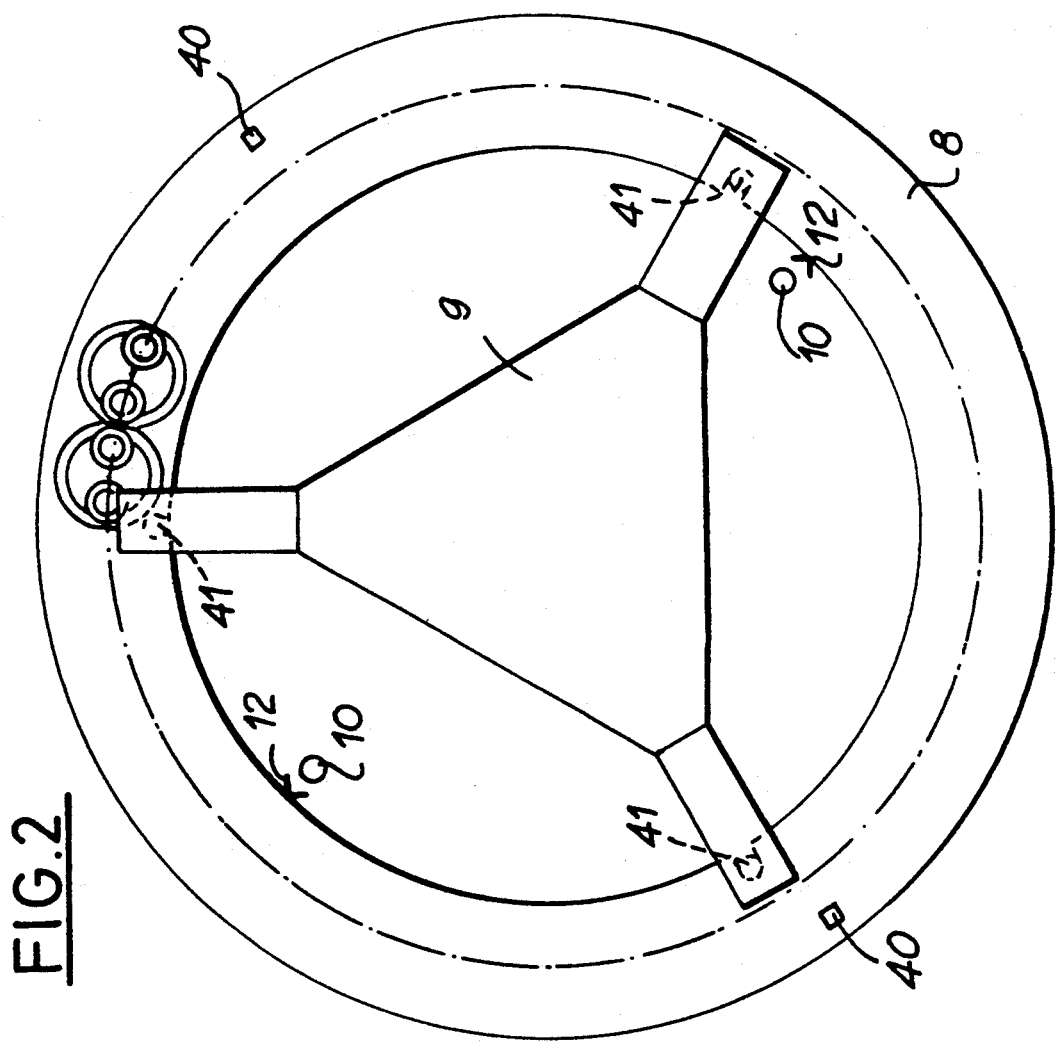

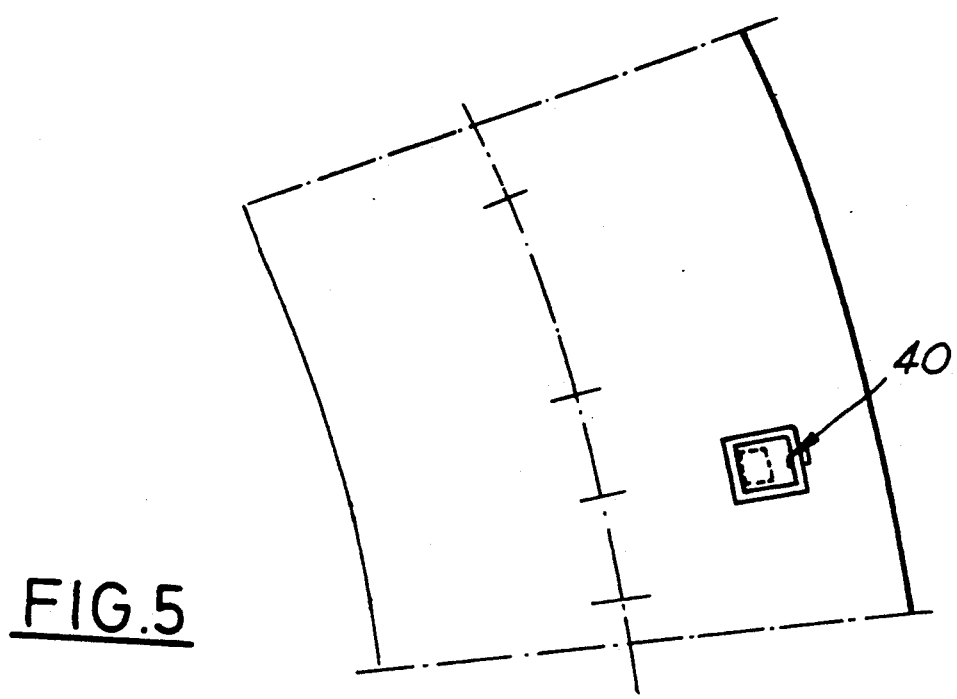
FIG.5
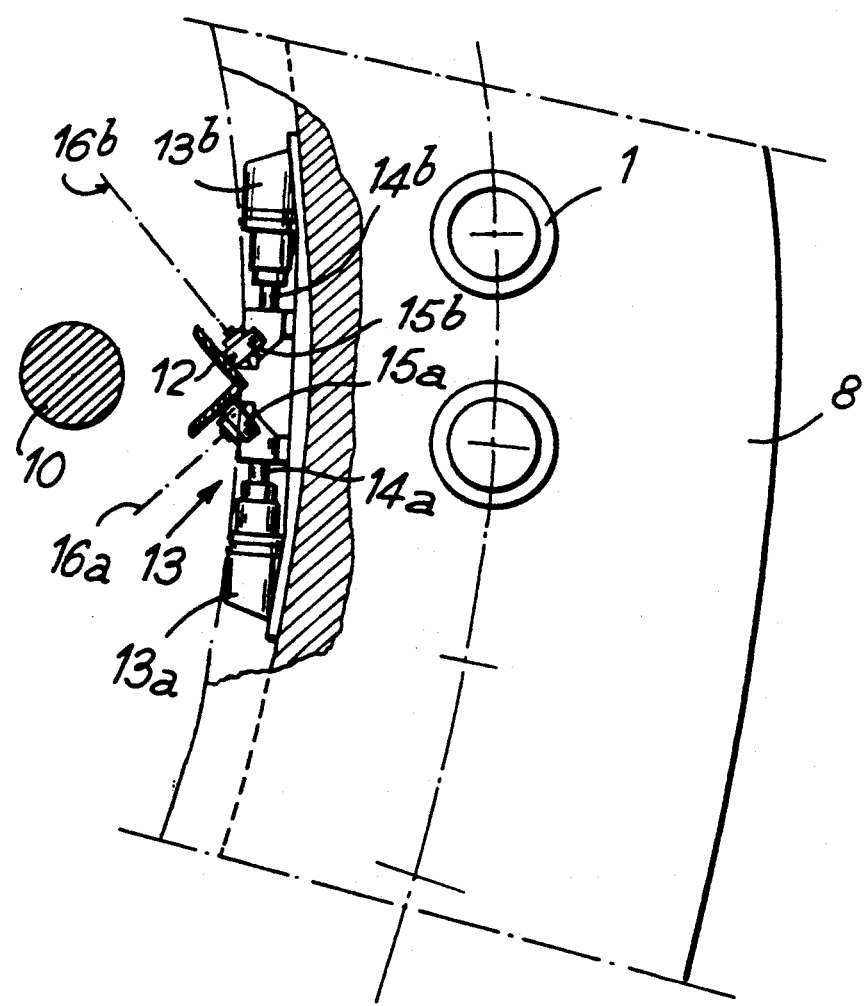

DEVICE FOR THE SIMULTANEOUS POSITIONING OF A PLURALITY OF THREADED CONNECTING ELEMENTS

FIELD OF THE INVENTION

The present invention relates to a device for the simultaneous positioning of a plurality of threaded connecting elements for fastening a component to an appliance.

BACKGROUND OF THE INVENTION

In many industrial uses, a plurality of threaded connecting elements consisting, for example, of pins are employed for fastening a component removably to an appliance.

This is particularly true of the pressurized vessels used in industry, especially the nuclear industry, for example the vessels of nuclear reactors, or the chemical or petrochemical industry, where a cover is fastened removably to a vessel so that it is possible to perform periodic maintenance in the vessel.

For this purpose, the cover is fastened to the vessel by means of pins which are screwed into tapped holes provided in the upper part of the said vessel which penetrate into open-ended bores provided in the flange of the cover and corresponding to the tapped holes.

These pins are usually in somewhat large numbers and relatively close to one another, and therefore the removal and refitting of the cover require the positioning, unscrewing and screwing of all these pins in addition to their tensioning.

In order to place all the pins simultaneously in the open-ended bores of the cover and in the tapped holes of the vessel, the pins are arranged on a supporting member which, as regards the vessel of a nuclear reactor, consists, for example, of a rigid ring, on which the pins are uniformly distributed in polar symmetry.

Until now, the pins were centered in relation to the open-ended bores of the cover and to the tapped holes of the vessel has been obtained by vertically moving the supporting member which is positioned axially in relation to the axis of the cover, and which is guided by a set of rails arranged externally on the upper part of the cover, itself being mounted on the vessel.

It is known that the production of the cover and the vessel allows for production tolerances and that assembling these elements together requires the presence of functional plays.

Moreover, the tapped holes located on the vessel have a position which is diametral in relation to the principal axis of the vessel.

Consequently, because there is no single reference, the cover occupies a particular position independent in relation to the vessel.

Thus, ideal positioning, i.e. perfect superposition of the axis of a pin with the axis of the corresponding tapped hole occurs only by coincidence. This is unsatisfactory and unacceptable for repetitive operations carried out, for example, in a confined environment.

SUMMARY OF THE INVENTION

The object of the present invention is to provide a device which makes it possible to align and position the threaded connecting elements in the extension of the corresponding tapped holes, the axes of the tapped holes being adopted as the reference axis.

According to the invention, the device for the simultaneous positioning of a plurality of threaded connecting elements carried by a supporting member and intended for fastening a component placed on an appliance and having open-ended bores for the passage of the threaded connecting elements, appliance having tapped holes corresponding to the open-ended bores and capable of receiving the threaded connecting elements, comprises:

means for the permanent checking and correction of the position of the axes of the threaded connecting elements in relation to the axes of the corresponding tapped holes, means for the permanent checking and correction of the horizontality of the supporting member, and means for handling the supporting member.

According to other characteristics of the invention:

means for the permanent checking of the position of the axes of the threaded connecting elements in relation to the axes of the corresponding tapped holes comprise at least two laser generators mounted on the supporting member and each intended for interacting with a receiver cell mounted on the appliance, each laser generator is mounted on the supporting member by means of an adjustment plate making it possible to position the generator according to an axis parallel to the axes of the threaded connecting elements, each receiver cell is mounted on the appliance by means of a supporting plate according to an axis parallel to the axes of the tapped holes of the appliance, the axis being the reference axis for the positioning of the supporting member of the threaded connecting elements, the supporting plate comprises two bores separated from one another by a space corresponding to the spacing of two mutually adjacent tapped holes, each bore being equipped with means for centering on the corresponding tapped hole, each bore of the supporting plate is open radially in order partially to encircle the corresponding tapped hole, the means for correction of the position of the axes of the threaded connecting elements in relation to the axes of the corresponding tapped holes are formed by at least one pair of mutually opposed jacks which are fastened to the supporting member in a horizontal position and each rod of which is equipped, at its free end, with at least one roller interacting with a guide ramp belonging to the supporting member and mounted on the component intended to be fastened to the appliance, each roller is mounted on an axis parallel to the contact surface of the corresponding guide ramp, the means for permanent checking of the horizontality of the supporting member of the threaded connecting elements comprise at least two inclinometers mounted on the supporting member, the means for correction of the horizontality of the supporting member of the threaded connecting elements comprise isolevelling jacks interposed between the handling means and the supporting member.

BRIEF DESCRIPTION OF THE DRAWINGS

The invention will be better understood from the following description given solely by way of example and with reference to the accompanying drawings in which:

FIG. 2 is a top plan view of FIG. 1, FIG. 5 is a sectional view along the line 5—5 of FIG. 3, FIG. 6 is a sectional view along the line 6—6 of FIG. 3.

DESCRIPTION OF PREFERRED EMBODIMENT

Figure 1:
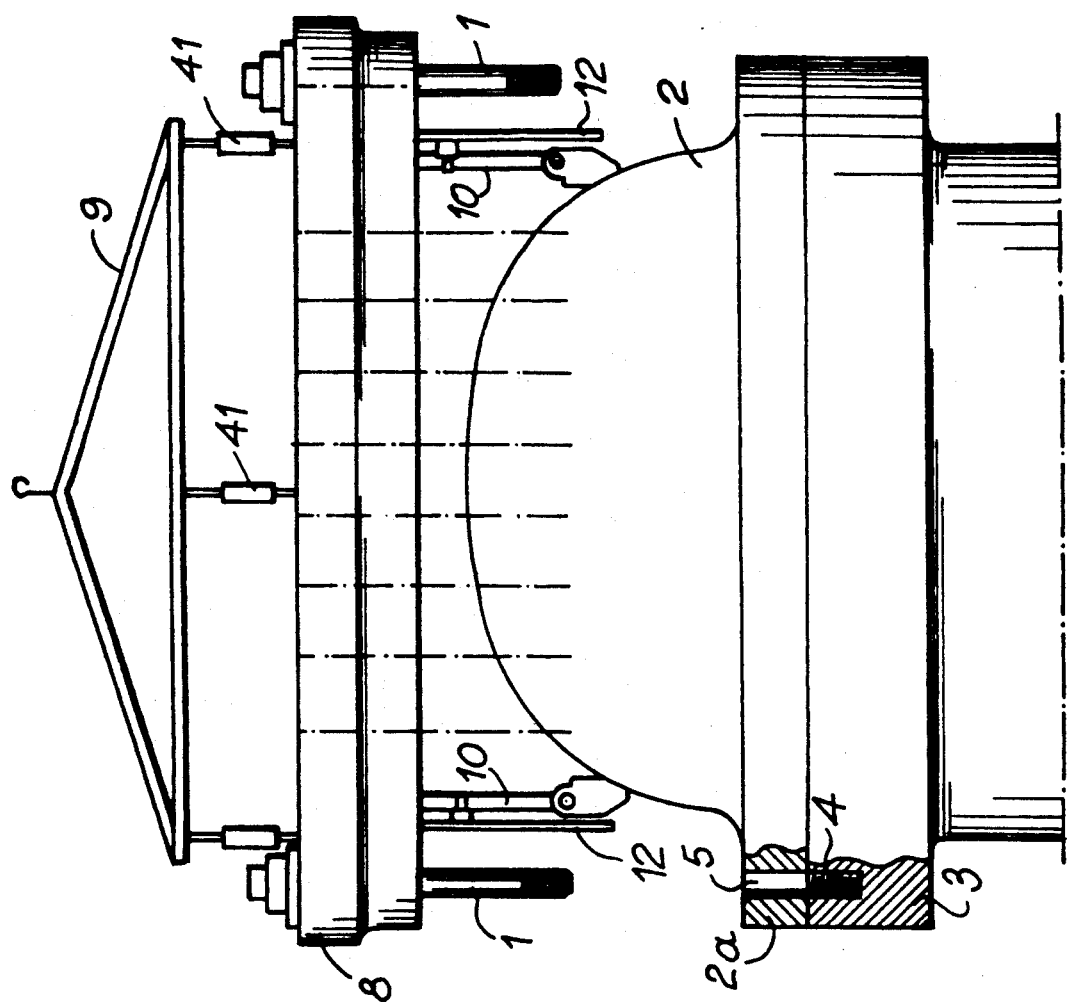
FIG. 1 is a schematic plan view of the positioning device according to the invention arranged above the cover of a vessel of a nuclear reactor.

A device according to invention, as illustrated in FIGS. 1 and 2, is used for the simultaneous positioning of a plurality of threaded connecting elements 1 consisting, for example, of pins and intended for fastening a cover 2 to a vessel 3, for example that of a nuclear reactor.

For this purpose, the upper part of the vessel has a set of tapped holes 4 distributed, symmetrically over a circumference concentric with the principal axis of the vessel and each intended for receiving the threaded end of a connecting element 1.

The cover 2 is provided a peripheral flange 2a pierced with open-ended bores 5 corresponding to the tapped holes 4 of the vessel 3 and distributed symmetrically over the circumference concentric with the principal axis of the cover. Each open-ended bore 5 is intended for the passage of a threaded connecting element 1.

Figure 3:
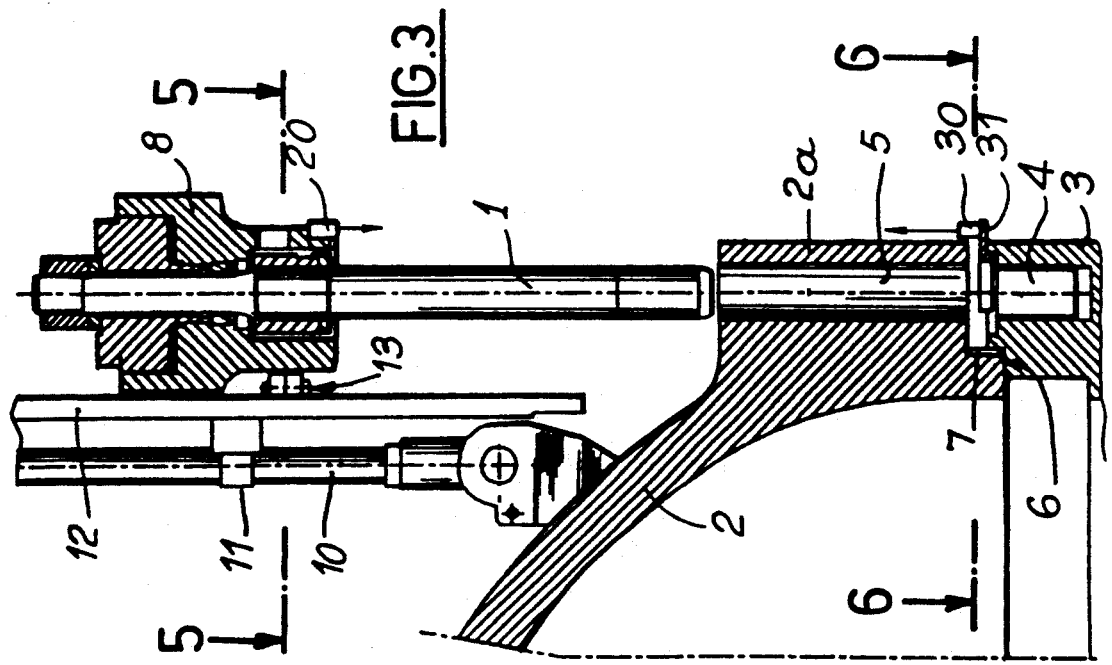
FIG. 3 is a partial sectional view of the positioning device according to the invention on a larger scale.

As shown in FIG. 3, the inner periphery of the vessel 3 has an axial countersink 6 and by interlocking receives a centering means 7 provided on the flange 2a of the cover 2.

The set of threaded connecting elements 1 corresponding to the number of open-ended bores 5 and tapped holes 4 is carried by a supporting member 8 consisting, in this particular case, of a rigid ring on which the connecting elements 1 are uniformly distributed in polar symmetry (FIG. 2).

This supporting member 8 equipped with the set of threaded connecting elements 1 is supported by handling means 9 consisting, for example, of a lifting beam, in such a way that it can be brought into a position overhanging the flange 2a of the cover 2 in place on the vessel 3.

The device according to the invention includes means for the permanent checking and correction of the position of the axes of the threaded connecting elements 1 in relation to the axes of the corresponding tapped holes 4, and means for permanent checking and correction of the horizontality of the supporting member 8.

For this purpose, the cover 2 is surmounted by two diametrically opposed vertical columns 10, on which are placed fastening collars 11 (FIG. 3) blocked in position by conventional fastening means (not shown).

Mounted on the fastening collars 11 of each column 10 is a V-shaped guide ramp 12 ensuring the vertical guidance of the supporting member 8.

The device thus has two diametrically opposed guide ramps 12 which each interact with means for the correction of the position of the axes of the thread connecting elements 1 in relation to the axes of the tapped holes 4 of the vessel 3.

These means consist of double-acting hydraulic jacks 13 grouped so as to form at least two pairs of diametrically opposed jacks (FIG. 5).

Each pair of jacks 13 comprises two opposite jacks 13a, 13b (FIG. 5) located on the inner periphery of the supporting member 8 and fastened in a horizontal position.

Each jack 13a and 13b has an output rod 14a and 14b, the free end of which is equipped with a roller 15a and 15b interacting with the corresponding contact surface of the guide ramp 12.

Each roller 15a and 15b is mounted on an axis 16a and 16b parallel to the corresponding contact surface of the said guide ramp 12.

Figure 4:
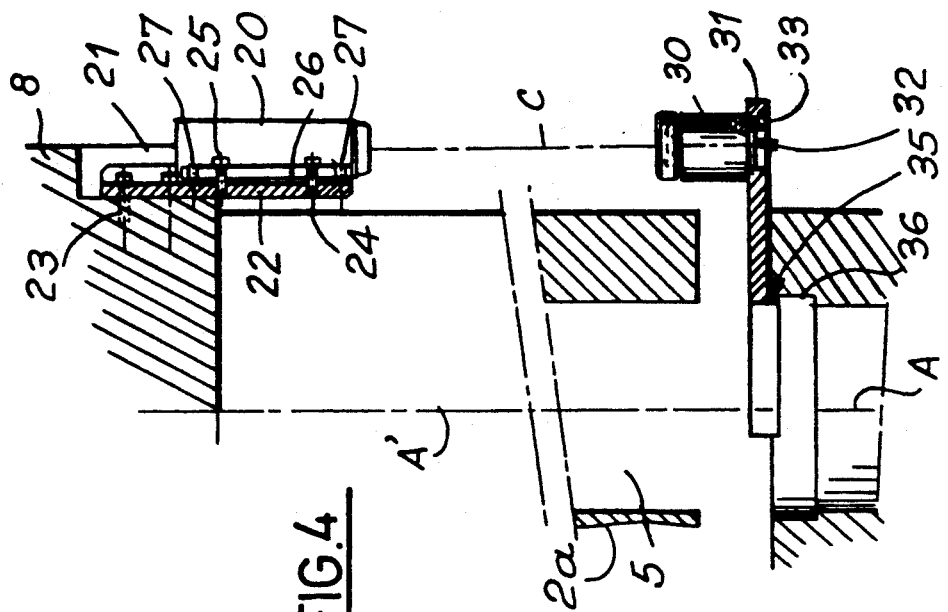
FIG. 4 is a sectional view of a laser generator and of its corresponding receiver cell.

Referring now to FIGS. 3 and 4, the means for the permanent checking of the position of the axes of the threaded connecting elements 1 in relation to the axes of the corresponding tapped holes 4 will be described.

These means make use of at least two laser beams.

For this purpose, the supporting member 8 has two diametrically opposed laser generators 20 which are each intended for interacting with a receiver cell 30 mounted on the vessel 3.

Each laser generator 20 is located on the outer periphery of the supporting member 8, in which is formed a recess 21 serving for accommodating an adjustment plate 22 fastened, for example, by means of the screws 23.

The adjustment plate 22 has tapped holes 24, into which are screwed fastening screws 25 blocking a sole piece 26 of the laser generator 20.

Pressure screws 27 make it possible to adjust the position of the said laser generator 20 along a vertical axis parallel to the axes of the threaded connecting elements 1.

Each receiver cell 30 is carried by a supporting plate 31 which for this purpose has a bore 32 of axis C, in which the cell is fastened by means of screws 33 (FIG. 4). This receiver cell 30 is therefore positioned in alignment with the axis C of the bore 32.

The supporting plate 31 comprises two bores 34 distant from one another by a space corresponding to the spacing of two mutually adjacent tapped holes 4, i.e., of two threaded connecting elements 1.

Each bore 34 of axis A' (FIG. 4) is open radially, thereby allowing a partial encircling of the corresponding tapped hole 4 and therefore of the corresponding threaded connecting element 1 when the latter is screwed into the tapped hole.

Each bore 34 is provided with a centering means 35 which projects from the lower face of the supporting plate 31 and which is concentric and open in the same way as the bore.

The centering means 35 is placed in a countersink 36 formed in the upper part of the corresponding tapped holes 4. Each countersink 36 is defined by an axis A which is also that of the corresponding tapped hole 4 and which is positioned on the circumference concentric with the principal axis of the vessel 3.

This arrangement ensures perfect superposition of the axes A and A', and the axis C of the receiver cell 30 is therefore parallel to the axes of the tapped holes 4 of the vessel 3.

The axis C of the receiver cell 30 thus becomes the reference in relation to which the supporting member of the threaded connecting elements 1 is positioned.

Moreover, the device according to the invention has means for the permanent checking and correction of the horizontality of the supporting member 8 of the threaded connecting elements 1.

These means consist of at least two inclinometers 40 (FIGS. 2 and 5) which are provided on the supporting member 8 and which, in the dynamic phase, ensure permanent checking of the position of the supporting member, which must be strictly horizontal.

To guarantee this position, isolevelling jacks 41 (FIGS. 1 and 2) are provided between each fastening point of the supporting member 8 on the handling means 9 of the supporting member.

The device as a whole is managed by a programmable automatic control (not shown).

The device functions as follows:

First of all, the cover 2 is centered on the vessel 3, and then the supporting member 8 equipped with all the threaded connecting elements 1 is moved into position above the cover by the handling means 9.

When the lower end of the threaded connecting elements 1 is a few centimeters above the cover 2 of the vessel 3, the system is engaged. The inclinometers 40 check the horizontality of the supporting member 8 permanently, and the programmable automatic control commands the isolevelling jacks 41 as a function of the information transmitted by the inclinometers, so as to keep the supporting member 8 in a strict horizontal position.

Simultaneously, the programmable automatic control commands, on the one hand, the bringing of the rollers 15a and 15b of the jacks 13a and 13b of each pair of jacks 13 into contact with the corresponding guide ramps 12 and, on the other hand, the ignition of the laser generators 20, the beams of which illuminate the targets formed by the receiver cells 30.

The programmable automatic control analyzes the signals emitted by the receiver cells 30 and commands the jacks 13a and 13b as a function of the signals received, in order to make any corrections needed to bring the axes of the laser generators 20 into coincidence with the axes of the corresponding receiver cells 30 and to align the threaded connecting elements 1 with the corresponding tapped holes 4.

This location of the ideal position is carried out permanently until the threaded connecting elements pass through the open-ended bores 5 of the flange 2a of the cover 2.

Figure 7:
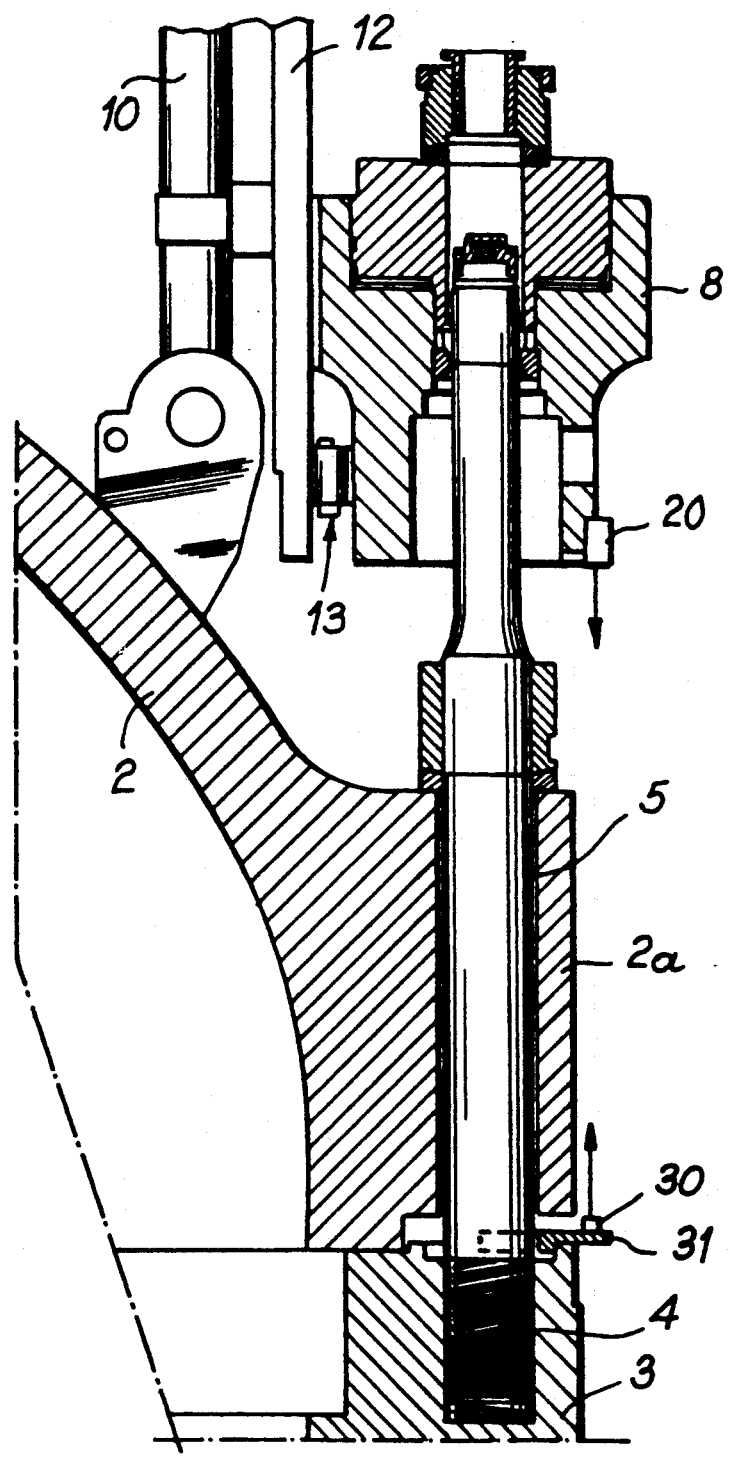
FIG. 7 is a view identical to that of FIG. 3, showing the positioning of a threaded connecting element in its corresponding tapped hole.

The threaded connecting elements are subsequently screwed into the tapped holes 4 (FIG. 7) by suitable means (not shown).

The presence of the cover 2 in place on the vessel 3 serves as a fixed point allowing the supporting member to come to bear on this so as to locate there the ideal position which makes it possible to carry out the screwing operations under the best possible conditions.

The position of the cover in relation to the vessel can therefore be ignored, so long as the axis of each open-ended bore of the cover can be located on it within a particular tolerance range.

The device according to the present invention thus makes it possible to position simultaneously and accurately a plurality of threaded connecting elements in relation to tapped holes provided on an appliance and intended for receiving the elements for fastening a component to the appliance.

The device according to the invention is used not only in nuclear power stations, but in other sectors of the nuclear industry, in petroleum and petrochemical installations, in mining installations or for the enclosing of turbines, hydraulic valves, pressurized pipelines or valve bodies. In general terms, the device according to the invention is used within many industrial installations which employ screwing elements.

I claim:

1. Device for simultaneously positioning a plurality of threaded connecting elements (1) carried by a supporting member (8) and intended for fastening a component (2) to an appliance (3), said component having open-ended bores (5) for receiving said threaded connecting elements (1), and said appliance having threaded holes (4) corresponding to said open-ended bores (5) for receiving said threaded connecting elements (1), said device comprising:

(a) means for continuous checking and correction of the position of the axes of said threaded connecting elements (1) relative to the axes of their corresponding threaded holes (4), said means comprising at least two laser generators (20) mounted on said supporting member (8), each of said laser generators interacting with respective receiver cells (30) mounted on said appliance (3), each laser generator (20) being mounted on said supporting member (8) by means of an adjustment plate (22, 27) which can be adjusted to position said laser generator on an axis parallel to said axes of the threaded connecting elements (1);

(b) means for continuous checking and correction of the horizontality of said supporting member (8); and (c) means (9) for handling said supporting member (8).

2. Device according to claim 1, wherein said means for continuous checking and correction of horizontality comprises at least two inclinometers (40) mounted on said supporting member (8).

3. Device according to claim 1, wherein each said receiver cell (30) is mounted on said appliance (3) by means of a supporting plate (31) on an axis parallel to said axes of said threaded holes (4) of said appliance (3), said axis constituting a reference axis for positioning said supporting member (8).

4. Device according to claim 3, wherein said supporting plate (31) comprises two bores (34) separated from one another by a space corresponding to a spacing of adjacent threaded holes (4), each of said bores (34) being provided with means (35) for centering said bore on said corresponding threaded hole (4).

5. Device according to claim 4 wherein each of said bores (34) forms an open arc partially surrounding said corresponding threaded hole (4).

6. Device according to claim 1, wherein said means for correction of the position of said axes of said threaded connecting elements (1) is constituted by at least one pair of mutually opposed jacks (13a, 13b) fastened to said supporting member (8) in a horizontal position, each lifting rod (14a, 14b) of said jacks being provided, at a free end of said rod, with at least one roller (15a, 15b) which interacts with a guide ramp (12) mounted on said component (2).

7. Device according to claim 6, wherein each said roller (15a, 15b) is mounted on an axis (16a, 16b) parallel to its respective contact surface on said guide ramp (12).

8. Device according to claim 1, wherein said means for the correction of horizontality of said supporting member (8) comprises isolevelling jacks (41) interposed between said handling means (9) and said supporting member (8).

* * * * *